United States Patent [19]
Ootsuki et al.

[11] Patent Number: 5,816,385
[45] Date of Patent: Oct. 6, 1998

[54] MAGNETIC CONVEYING DEVICE WITH NON-MAGNETIC GUIDE RAILS

[75] Inventors: Katsumi Ootsuki, Toyama; Teruo Ookawa; Masatoshi Kajiwara, both of Shiga-ken, all of Japan

[73] Assignee: Murata Manufacturing Co., Ltd., Nagaokakyo, Japan

[21] Appl. No.: 782,795

[22] Filed: Jan. 13, 1997

[30] Foreign Application Priority Data

Oct. 16, 1996  [JP]  Japan .................................... 8-023229

[51] Int. Cl.$^6$ .................................................. B65G 15/00
[52] U.S. Cl. ........................................................ 198/690.1
[58] Field of Search ................................ 198/690.1, 725

[56] References Cited

U.S. PATENT DOCUMENTS

3,272,313   9/1966   Sarovich ............................. 198/690.1

Primary Examiner—William E. Terrell
Assistant Examiner—Khoi H. Tran
Attorney, Agent, or Firm—Burns, Doane, Swecker & Mathis, LLP

[57] ABSTRACT

A conveying device which is capable of conveying a magnetic workpiece at high speed with low vibration and low noise and which makes it possible to perform a highly accurate positioning. The conveying device includes a non-magnetic rail which has a guide surface for slidably guiding a first surface of the workpiece and a non-magnetic conveying belt which has a conveying surface coming into contact with a second surface of the workpiece and which is movable along the rail. The belt is driven to rotate by a driving device. A magnet is arranged at a position opposite to the rail with the belt therebetween and generates a magnetic force having a component force which causes the second surface of the workpiece to be brought into close contact with the belt and a component force which causes the first surface of the workpiece to be brought into contact with the rail.

20 Claims, 8 Drawing Sheets

FIG. 11 ial No. 7-35388, a transfer guide device has been
MAGNETIC CONVEYING DEVICE WITH NON-MAGNETIC GUIDE RAILS

BACKGROUND OF THE INVENTION

1. Field of the Invention

The present invention relates to a conveying device and, in particular, to a conveying device which is suitable for the conveyance of magnetic workpieces such as lead frames formed of a ferromagnetic material or magnetic material.

2. Description of the Related Art

Conventionally, when conveying a hoop material such as a lead frame material during a production process, it has been a general practice to convey the material in a continuous form, without cutting it at a fixed length. The hoop material is generally stored before processing on a reel, hence the term. In conventional conveying devices, reciprocating feeding claws are provided. When feeding a hoop material, the feeding claws are engaged with holes in the hoop material and movement of the material is effected in this condition. When the feeding claws are retracted, the feeding claws are detached from the holes of the hoop material and the hoop material is kept stationary. At this time, to prevent the hoop material from moving backward, an auxiliary means for keeping the hoop material stationary, such as an air cylinder or a one-way clutch, is used.

To achieve a high level of accuracy in terms of a stop position of the hoop material, it is necessary to restrain the deflection and vibration thereof. For this purpose, the hoop material is constantly kept under tension through a combination of a brake sprocket and a tension roller in the conventional conveying device.

However, in the conventional conveying device, as the feeding claws detaches from the hole in the hoop material, the accuracy in the stop position tends to be adversely affected by the pitch dimension accuracy (which is accumulated) of the hoop material, expansion of the hoop material by heat, etc.

Further, due to the reciprocating movement of the feeding claws by a cam mechanism, a returning time required for the feeding claws to return to an initial position affects the tact time. Additionally, the higher the speed, the greater are the vibrations and noise caused by the feeding claws and cam mechanism. Furthermore, it is necessary to provide a device for preventing the hoop material from moving backward, a device for giving tension, etc., resulting in an increase in the conveying device size.

As disclosed in Japanese Unexamined Utility Model Publication No. 7-35388, a transfer guide device has been proposed in which a lead frame is guided on the upper surface of a non-magnetic guide rail, and a non-magnetic guide member is provided on one side of the upper surface of the guide rail, with magnets being embedded at appropriate intervals in this guide member.

In this case, the side edge of the lead frame is attracted by the magnetic force and brought into contact with the guide member, so that a high level of positional accuracy is achieved. Further, there is advantageously no need to provide a device for preventing the hoop member from moving backward, a device for giving tension, etc.

However, in this conveying device, it is still necessary to use a transfer means such as a feeding claw to transfer the lead frame, so that it is difficult to realize a high-speed conveyance with low vibration and low noise. Further, since the lead frame is in close contact with the guide member, there is a frictional resistance between the guide member and the lead frame, so that, when the transfer means is engaged with the lead frame to transfer it, a large load is partially applied to the lead frame, with the result that there is a concern about the lead frame being expanded or deformed.

SUMMARY OF THE INVENTION

It is accordingly an object of this invention to provide a conveying device which can convey a magnetic workpiece with low vibration and low noise and which makes it possible to realize highly accurate positioning.

Further, the present invention aims to provide a conveying device which is capable of conveying a workpiece without applying an excessive load on it.

To achieve the above objects, there is provided, in accordance with the present invention, a device for conveying a magnetic workpiece having two adjacent surfaces, the device comprising: a non-magnetic rail having a guide surface for slidably guiding a first surface of the workpiece; a non-magnetic conveying member which has a conveying surface held in contact with a second surface of the workpiece and which is movable relative to the rail; driving means for driving the conveying member to cause it to move relative to the rail; and a magnet, such as an permanent magnet or an electromagnet, arranged at a position opposite to the rail with the conveying member therebetween and adapted to generate a magnetic force having a component force which causes the second surface of the workpiece to be brought into close contact with the conveying member and a component force which causes the first surface of the workpiece to be brought into contact with the rail.

It is desirable to mount yokes to both poles of the above-mentioned magnet and to position the guide surface of the rail in the vicinity of the boundary portion between one pole of the magnet and the yoke.

Further, it is desirable for the conveying member to include a non-magnetic belt and for the driving means to include a pulley around which the belt is wound and a motor for driving the pulley. A plurality of such belts can be placed adjacent one another to make up the conveying member. Alternatively, the conveying member can include a turntable.

Further, the present invention is suitable for the conveyance of a thin and long workpiece such as a magnetic hoop material.

When the conveying member is moved along the rail by the driving means, the workpiece moves together with the conveying member since the second surface of the workpiece is held in close contact with the conveying surface of the conveying member by the magnet. At this time, the first surface of the workpiece is slidably guided by the guide surface of the rail, so that the workpiece is conveyed while keeping a stable attitude. During the conveyance, the workpiece moves while being kept in close contact with the conveying member, so that the load is not concentrated on a part of the workpiece. Thus, conveyance is possible without applying an excessive load to the workpiece, thereby preventing the workpiece from being deformed or deflected.

When the conveying member is abruptly stopped, there is a concern about the workpiece being shifted by an inertial force. In the present invention, however, the second surface of the workpiece is in close contact with the conveying member by a magnetic force, so that even if the conveying member is abruptly stopped, it can be stopped without causing the workpiece to be shifted relative thereto. Further, there is no need to provide a device for preventing the hoop member from moving backward or a device for providing tension, so that the size of the device can be reduced.

The conveying member of the present invention is driven to rotate, and there is no need to perform returning operation, so that a high-speed conveyance is possible and no excessive vibration or noise is involved despite the increase in speed. The conveying member of the present invention may be a continuous member adapted to rotate. It may be a belt, but it may also be a turntable having a cylindrical peripheral surface. There is no need for the conveying surface of the conveying member to be smooth. It may have surface irregularities.

Further, in order that the magnetic force of the magnet may be transmitted through the conveying member and efficiently applied to the workpiece, it is desirable for the conveying member to be of a thin-walled configuration and formed of a material having a high magnetic permeability.

There is no requirement for the two adjacent surfaces of the workpiece to be at right angles with respect to each other. Further, one of them may be a curved surface.

The magnetic force of the magnet includes a component force for bringing the second surface of the workpiece into close contact with the conveying member and a component force for bringing the first surface of the workpiece into contact with the rail. To make the sliding friction between the workpiece and the rail as small as possible, it is desirable to position the magnet such that the component force for bringing the second surface of the workpiece into close contact with the conveying member is larger than the component force for bringing the first surface of the workpiece into contact with the rail.

DESCRIPTION OF THE PREFERRED EMBODIMENTS

FIGS. 1 through 7 show a first embodiment of the present invention. The workpiece conveyed by this conveying device is a lead frame W.

Figure 1:
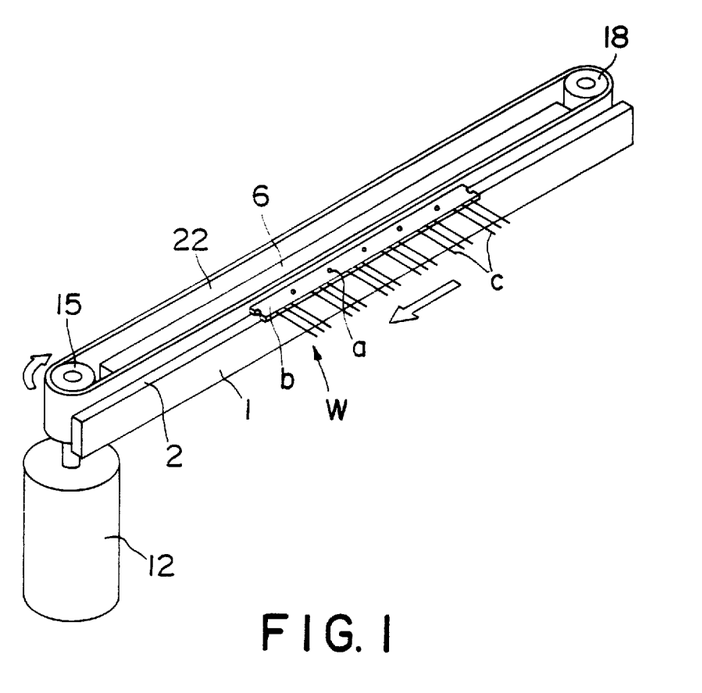
FIG. 1 is a schematic perspective view of a first exemplary embodiment of a conveying device in accordance with the present invention.
Figure 2:
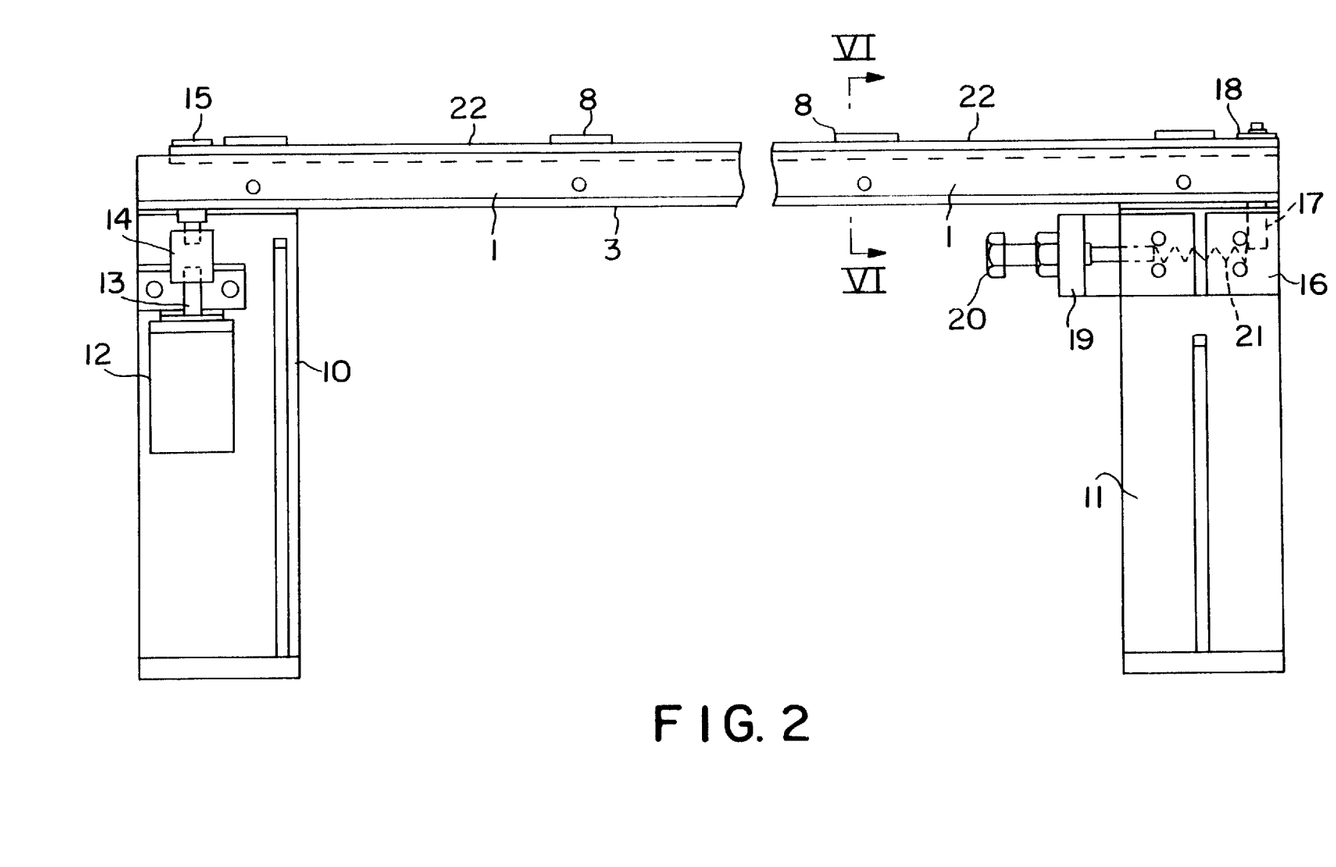
FIG. 2 is a front view of the conveying device shown in FIG. 1.
Figure 3:
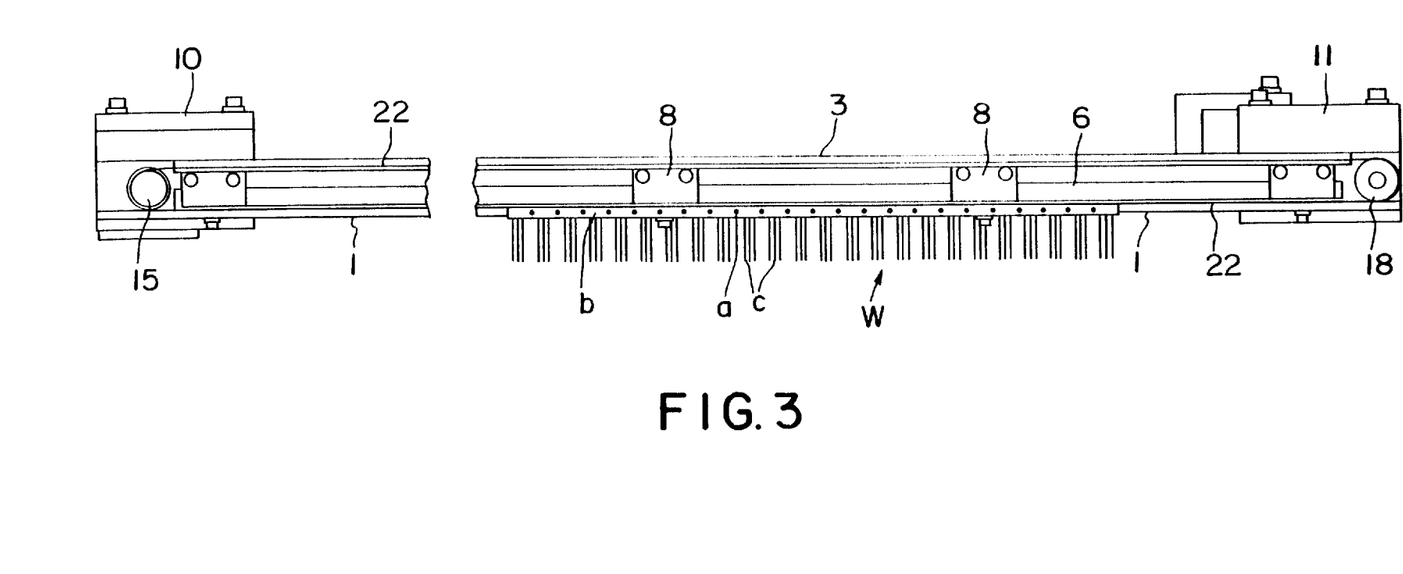
FIG. 3 is a plan view of the conveying device of FIG. 2.
Figure 4:
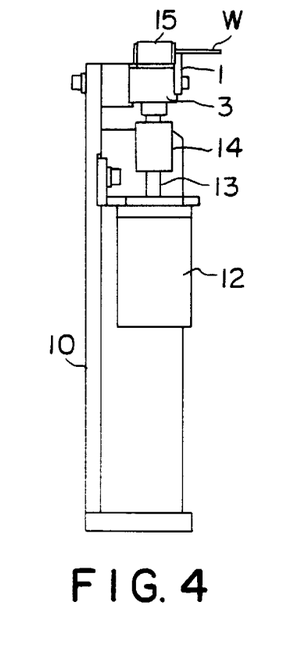
FIG. 4 is a left-hand side view of the conveying device of FIG. 2.
Figure 5:
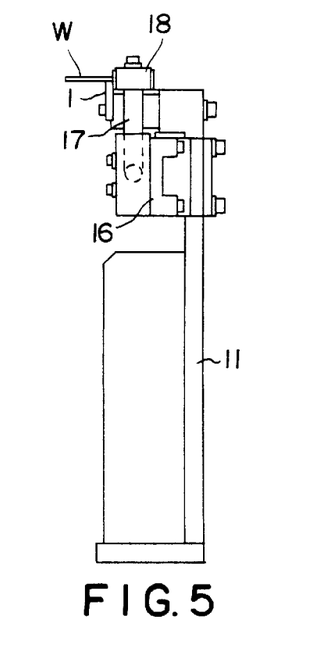
FIG. 5 is a right-hand side view of the conveying device of FIG. 2.
Figure 6:
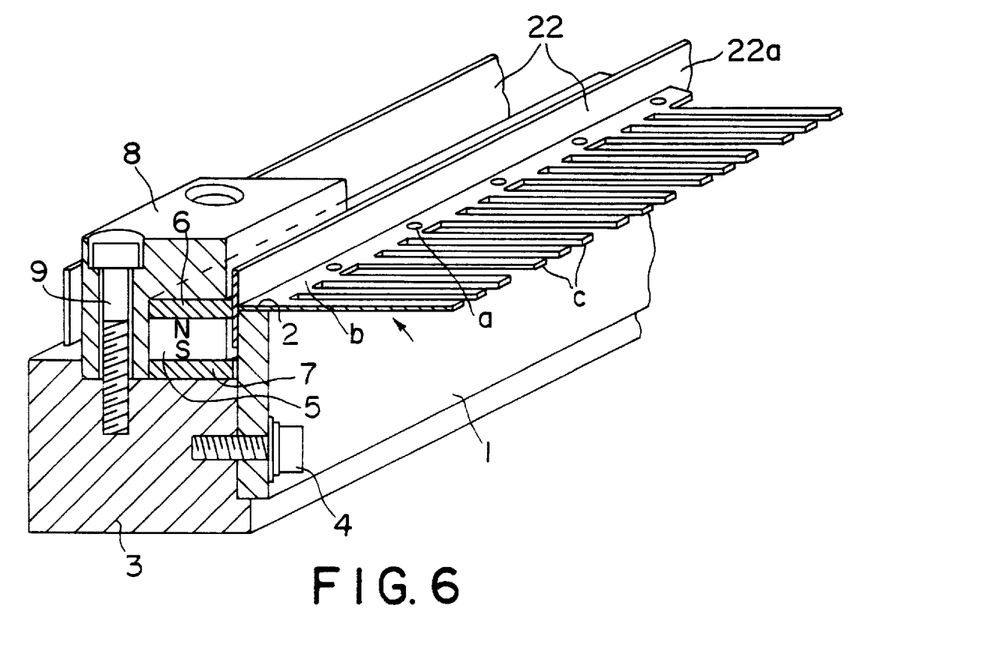
FIG. 6 is an enlarged partial perspective view of the conveying device of FIG. 2, which shows a section taken along the line VI—VI.

As shown in FIGS. 1 and 6, the lead frame W of this embodiment is cut to a fixed length. The lead frame W is formed by punching a thin magnetic metal plate made of, e.g., ferro-magnetic material. A tiebar "b" having feed holes "a" is formed on one longitudinal side edge of the lead frame. On the other side edge, there are integrally formed a plurality of terminal portions "c" protruding from the tiebar "b" in a direction substantially perpendicular thereto.

This conveying device has a rail 1 which slidably supports a side surface (first surface) of the tiebar "b". The rail 1 is formed of a non-magnetic material (e.g., a material that has a high magnetic permeability) such as stainless steel, aluminum, resin or other non-ferro-magnetic material. On the upper surface (guide surface) 2 thereof, a fluororesin coating or the like is appropriately provided in order to reduce the frictional resistance between the surface 2 and the lead frame W. As shown in FIG. 6, the rail 1 is fixed to the front surface of a rail base 3, which is formed of a non-magnetic material, by a screw 4. On the rail base 3, there is arranged a permanent magnet 5 to the N and S poles of which yokes 6 and 7 formed of a magnetic material are respectively attached. The permanent magnet 5 is fixed to the rail base 3 by magnet holders 8 provided at appropriate intervals. While the yokes 6 and 7 are long materials having substantially the same length as that of the rail base 3, there is no need for the permanent magnet 5 to be a long material like the yokes 6 and 7. It is also possible to intermittently arrange permanent magnets. The magnet holders 8 are fixed to the rail base 3 by screws 9.

As shown in FIGS. 2 through 5, the end portions of the rail base 3 are supported in a horizontal position by support bases 10 and 11. To one support base 10, a driving motor 12 consisting of a servo motor or a pulse motor or the like is fixed. The rotating shaft 13 of the motor 12 is connected to a drive side pulley 15 through a coupling 14. The other support base 11 is provided with a horizontally slidable slide table 16, and a tension pulley 18, which also serves as the driven pulley rotatably mounted on this slide table 16 through the intermediation of a support shaft 17. A tension adjusting bolt 20 is threadedly engaged with a bracket 19 fixed to the upper portion of the support base 11, and a tension spring 21 is arranged between this bolt 20 and the slide table 16. As a result, the tension pulley 18 is biased in a direction opposite to that of the driving pulley 15 by the resilient force of the tension spring 21, and this spring force can be adjusted by the bolt 20, whereby the tension of a belt 22, described below, can be adjusted.

A belt 22 formed of a non-magnetic material is stretched with tension between the driving pulley 15 and the tension pulley 18 and is driven to rotate horizontally. The belt 22 may be a resin belt or a belt formed of a metal such as stainless steel. The belt 22 is formed to be thin and the conveying surface (feeding side) 22a of the belt 22 is capable of horizontally moving through the gap between the upper yoke 6 and the rail 1. The back side of the belt 22 is supported by the side surface of the yoke 6 and the conveying surface 22a of the belt 22 is substantially perpendicular to the guide surface 2 of the rail 1. The conveying surface 22a is in close contact with the end surface (second surface) of the tiebar "b" of the lead frame W.

Figure 7:
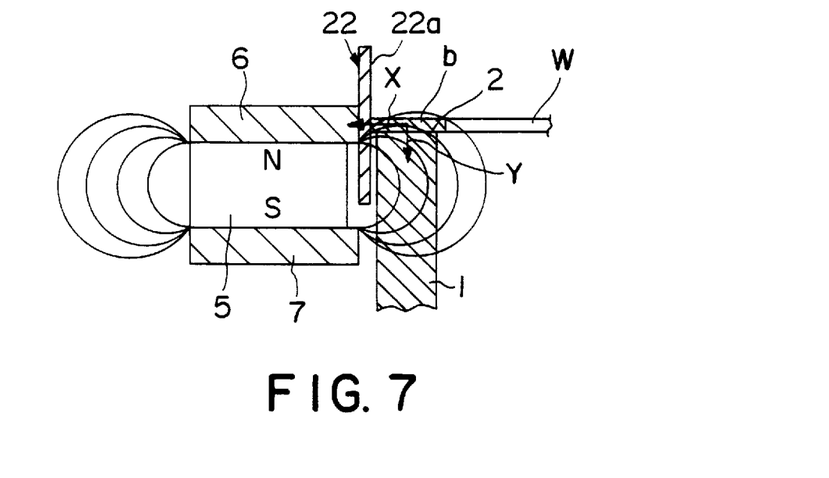
FIG. 7 is a sectional view showing the direction of the magnetic force in the conveying device of FIG. 2 taken along the line VI—VI.

Next, the operation of this conveying device will be described. Since the yokes 6 and 7 are arranged on the upper and lower poles of the permanent magnet 5, magnetic lines of force are concentrated, as shown in FIG. 7, in the interface between the yoke 6, 7 and the permanent magnet 5. Since the guide surface 2 of the rail 1 is situated in the vicinity of the interface between the upper yoke 6 and the permanent magnet 5, the tiebar "b" of the lead frame W sliding on the guide surface 2 is also situated at a position where the magnetic line of force is concentrated, so that it is most effectively affected by the magnetic force.

Here, the magnetic attracting force with respect to the lead frame W can be divided into two component forces X and Y. That is, the component of force X is a component of force which brings the end surface of the tiebar "b" of the lead frame W into close contact with the belt 22, and the component of force Y is a component of force which brings the side surface of the tiebar "b" of the lead frame W into close contact with the rail 1. The component of force X is larger than the component force Y.

Due to the magnetic force of the permanent magnet 5 as described above, the side surface of the lead frame W is held in close contact with the guide surface 2 of the rail 1 while the end surface of the lead frame W is held in close contact with the conveying surface 22a of the belt 22. Here, when the belt 22 is driven, the lead frame W is conveyed integrally with the rail 1. Tile sliding on the rail 1. Thus, even if the belt 22 is moved at high speed, rising, deflection, deformation, etc. of the lead frame W can be prevented. Further, since the belt 22 constituting the conveying member is driven to rotate, it is possible to restrain the generation of vibrations or noise as generated in the case of the conventional feeding claws, which make reciprocating movements.

The belt 22 and the lead frame W are in close contact with each other over the entire length thereof, so that the contact state can be secured over a long distance, whereby there is no fear of an excessive load being partially applied to the lead frame W. Thus, even if the lead frame W is formed of a thin material, it is possible to effectively prevent deformation, warpage, deflection, etc. of the lead frame W.

When the belt 22 is stopped, the lead frame W retains the stop position by the magnetic force of the permanent magnet 5, so that, even if it receives vibration or impact in this condition, the position of the lead frame W is not deviated, thereby achieving a high level of accuracy in positioning. Thus, when this conveying device is applied to an assembly process or a characteristic measuring process for electronic parts, little deviation is involved in terms of the positions of the electronic parts.

Further, since there is no need to provide a device for preventing the lead frame W from moving backward or a device for giving tension, it is possible to reduce the size of the device and simplify it.

Conventionally, it has been difficult to convey a hoop material cut at a fixed length, so that the conveyance has been conducted in a continuous form. In the present invention, in contrast, it is possible to cut the hoop material at a fixed length and convey it in this form. Thus, this conveying device is applicable to products of various specifications.

Further, by controlling the driving of the motor 9, the feeding speed for the lead frame W can be varied. Apart from the continuous feed, it is also possible to conduct tact feed, advance/retract switching, etc.

Figure 8:
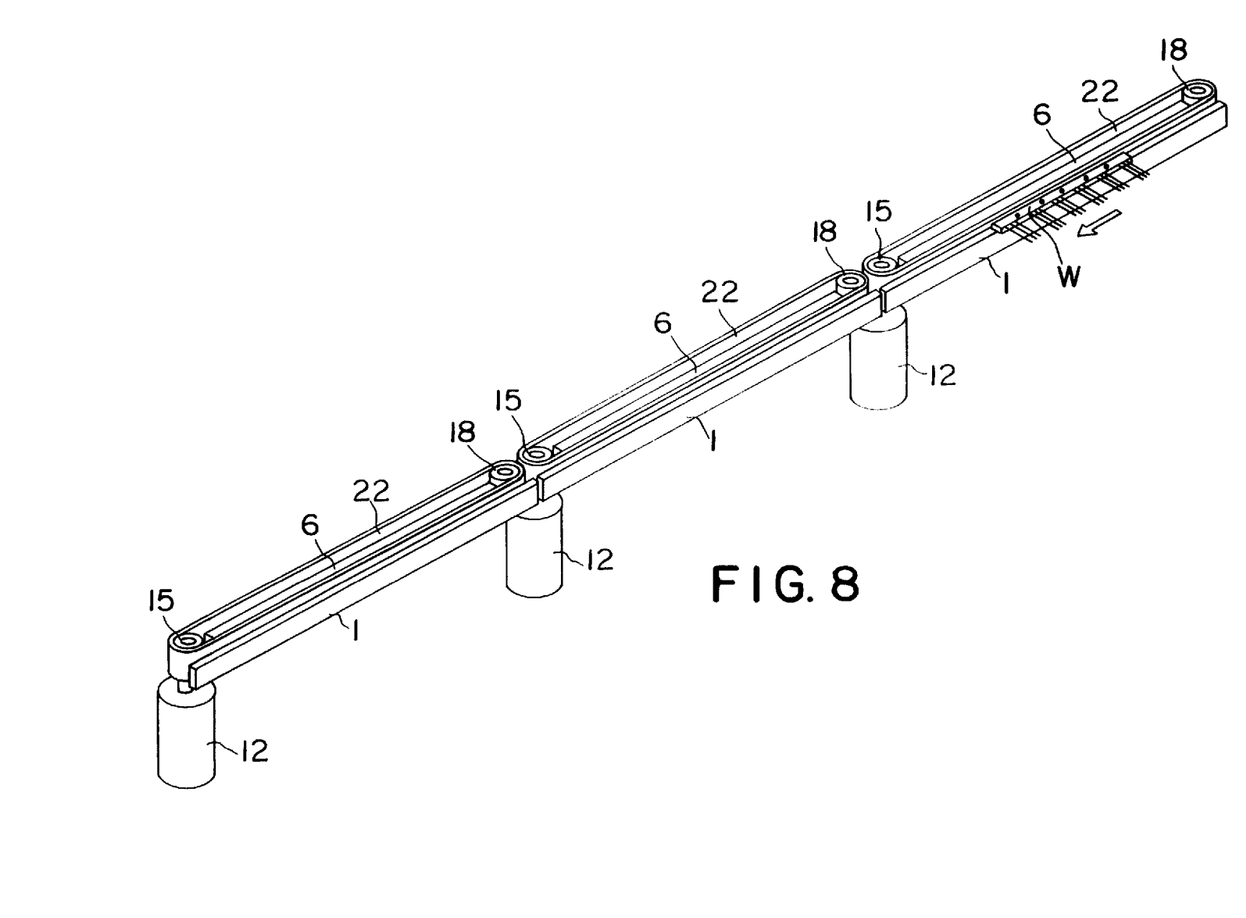
FIG. 8 is a schematic perspective view of a plurality of the conveying devices as shown in FIG. 1 coupled with each other.

While the above embodiment has been described with reference to a single unit, it is also possible to connect a plurality of units in series as shown in FIG. 8. In this case, the path of conveyance is long, and workpieces can be conveyed between a number of processes. In this case, by controlling the motor of each unit, it is also possible to drive the belts of the units in synchronism.

In this way, it is possible to add or delete units in accordance with the specifications of the processing equipment, whereby an improvement is achieved in terms of degree of freedom in designing.

Figure 9:
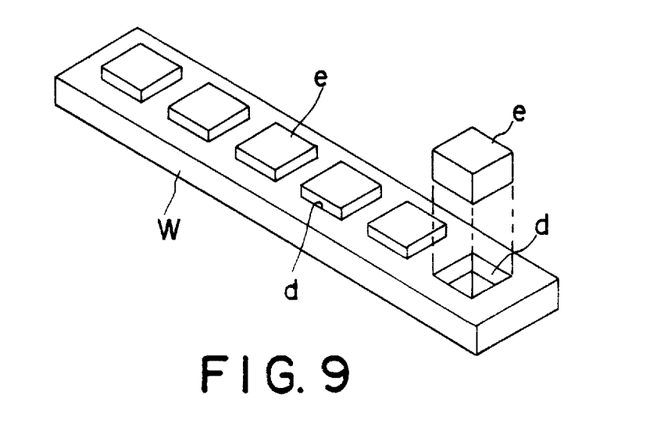
FIG. 9 is a perspective view of another example of workpiece.

FIG. 9 shows another example of workpiece that can be conveyed by the conveying device of the above-described embodiment.

This workpiece W is a pallet consisting, for example, of a magnetic material, on the surface of which a plurality of recesses "d" are formed. In these recesses "d", small parts "e" such as chip parts can be accommodated.

In this case also, the lower surface of the pallet W is slidably supported by the guide surface 2 of the rail 1, and the side surface of the pallet W is held in close contact with the belt 22.

In order that the chip parts "e" may not be damaged by the inner walls of the recesses "d", it is possible to form the inner walls of the recesses "d" of an elastic material such as silicon rubber.

Figure 10:
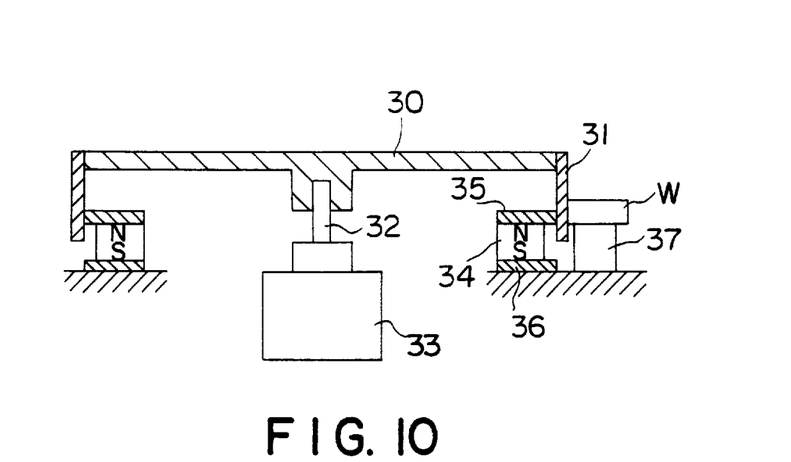
FIG. 10 is a sectional view of a conveying device according to a second exemplary embodiment of the present invention.

FIG. 10 shows a conveying device according to a second embodiment of the present invention.

This conveying device uses, as the conveying member, a non-magnetic turntable 30 having a cylindrical peripheral wall 31. The rotating shaft 32 of the turntable 30 is driven by a motor 33. On the inner peripheral side of the peripheral wall 31, there are arranged a permanent magnet 34 and yokes 35 and 36 provided on the upper and lower poles thereof. On the outer peripheral side of the peripheral wall, an annular or arcuate rail 37 is arranged.

The workpiece W is slidably arranged on the rail 37 and its side surface is held in close contact with the peripheral wall 31 of the turntable 30 by the magnetic force of the permanent magnet 34. Thus, when the turntable 30 is rotated, the workpiece W is circumferentially conveyed together with the peripheral wall 31 of the turntable 30.

In this case also, as in the first embodiment, little vibration or noise is involved even if the turntable 30 is rotated at high speed, and it is possible to achieve a high level of accuracy in terms of stop position for the workpiece W with respect to its travelling direction.

Figure 11:
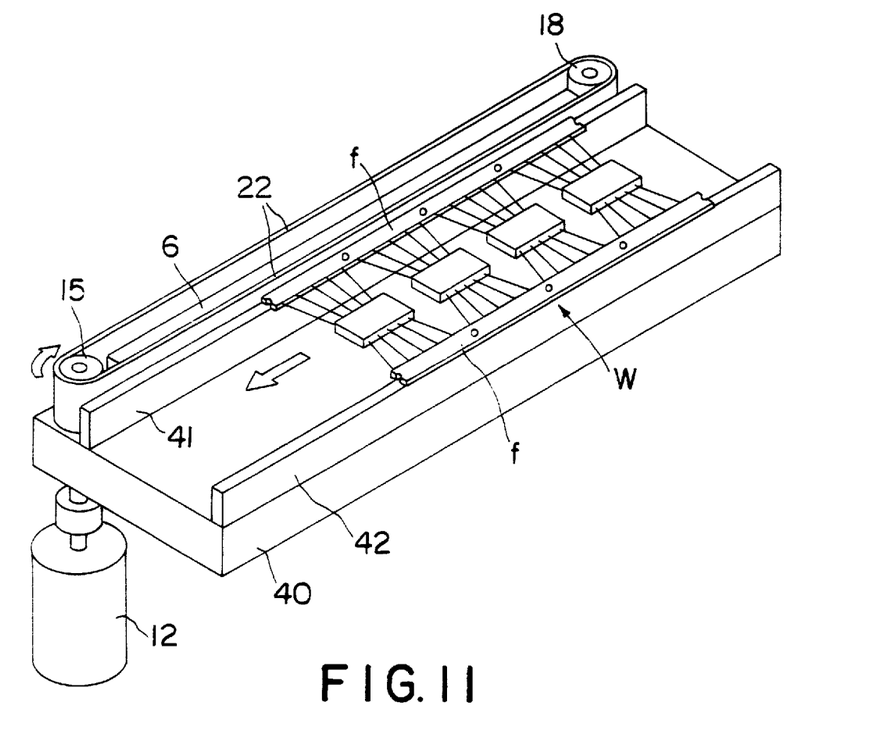
FIG. 11 is a perspective view of a conveying device according to a third exemplary embodiment of the present invention.

FIG. 11 shows a conveying device according to a third embodiment of the present invention.

This conveying device is used for the conveyance of a wide workpiece W such as an IC lead frame having a liner "f" on either side. Two non-magnetic rails 41 and 42 are arranged parallel to each other and fixed to a base 40, and a belt 22 similar to that of FIG. 1 is arranged on the outer side of one rail 41. On the inner side of the belt 22, a magnet (not shown) and a yoke 6 are arranged so as to be parallel to the direction of movement of the belt 22. At one end of the belt 22, a driving pulley 15 is arranged. This pulley 15 is driven by a motor 12 arranged below the base 40. Further, at the other end of the belt 22, a tension pulley 18, which also serves as the driven pulley, is rotatably supported on the base 40.

In this embodiment, the lower surfaces of the side portions of the workpiece are supported by a pair of rails 41 and 42, so that a stable conveyance is possible even in the case of a wide workpiece W.

The above-described embodiments only represent a few examples of the form of the present invention, and it goes without saying various modifications are possible.

While in the above embodiments the guide surface slidably guiding the first surface of the workpiece is a horizontal surface, and the conveying surface in contact with the second surface of the workpiece is a vertical surface, it is also possible for the conveying surface to be a horizontal surface and the guide surface a vertical surface.

Further, it is not necessary for the guide surface and the conveying surface to be perpendicular to each other. They may be inclined to be deviated from the right angle.

While in the above embodiments yokes are attached to the poles of the permanent magnet, it is possible to cause the workpiece to be attracted by the guide surface and the conveying surface without using yokes. However, by using yokes, the density in magnetic force is increased, whereby the workpiece can be attracted more effectively.

The magnet used in the present invention is not restricted to a permanent magnet. It is also possible to use an electromagnet. In particular, when extracting the workpiece from the conveying device, the workpiece can be easily extracted by demagnetizing the electromagnet.

As is apparent from the above description, in accordance with the present invention, the first surface of the workpiece is slidably guided by a non-magnetic rail, and the conveyance of the workpiece is effected with the second surface thereof being in close contact with a non-magnetic conveying member, so that, even in the case of high-speed conveyance, a positioning with high accuracy is possible. Further, since the first and second surfaces of the workpiece are respectively attracted by the rail and the conveying member, the attitude of the workpiece is stabilized, and it is possible to stop the conveyance of the workpiece abruptly without causing any positional deviation of the workpiece.

Further, since the conveying member is driven to rotate, there is no need to perform a returning operation as in the case of feed claws, whereby high-speed conveyance is possible with low vibration and low noise.

Further, there is no need to provide a device for preventing the workpiece from moving backward or a device for giving tension, thereby reducing the size of the conveying device and simplifying it.

The invention has been described by way of example. Naturally, other variations and modifications will occur to those skilled in the art without departing from the scope and spirit of the invention recited in the claims appended hereto.

What is claimed is:

1. A device for conveying a magnetic workpiece having two adjacent surfaces, the device comprising:
   a non-magnetic rail having a guide surface for slidably guiding a first surface of said workpiece;
   a non-magnetic conveying member which has a conveying surface held in contact with a second surface of said workpiece and which is movable relative to the rail;
   driving means for driving said conveying member to cause it to move relative to said rail; and
   a magnet arranged at a position opposite to said rail with said conveying member therebetween and adapted to generate a magnetic force having a component force which causes the second surface of the workpiece to be brought into close contact with said conveying member and a component force which causes the first surface of the workpiece to be brought into contact with said rail.

2. A conveying device according to claim 1,
   wherein yokes are attached to the poles of said magnet, and
   wherein the guide surface of said rail is situated in the vicinity of the interface between one pole of said magnet and the yoke.

3. A conveying device according to claim 1,
   wherein said conveying member comprises a non-magnetic belt, and
   wherein said driving means comprises a pulley around which the belt is to be wound and a motor for driving said pulley.

4. A conveying device according to claim 2,
   wherein said conveying member comprises a non-magnetic belt, and
   wherein said driving means comprises a pulley around which the belt is to be wound and a motor for driving said pulley.

5. A conveying device according to claim 1,
   wherein said non-magnetic conveying member comprises a plurality of non-magnetic belts, and
   wherein said driving means comprises a plurality of pulleys around which respective belts are to be wound and at least one motor for driving said plurality of pulleys.

6. A conveying device according to claim 1,
   wherein said non-magnetic conveying member comprises a turntable.

7. A conveying device according to claim 1,
   wherein said workpiece is a magnetic hoop material.

8. A conveying device according to claim 1,
   wherein said non-magnetic rail comprises a non-ferromagnetic material.

9. A conveying device according to claim 1,
   wherein said non-magnetic rail comprises a coating to reduce the frictional resistance between said rail and said workpiece.

10. A conveying device according to claim 1, further comprising a second non-magnetic rail.

11. A conveying device according to claim 1,
    wherein said non-magnetic conveying member comprises a non-ferromagnetic material.

12. A conveying device according to claim 1,
    wherein said magnet is one of an electromagnet and a permanent magnet.

13. A conveying device according to claim 1,
    wherein said component force which causes the second surface of the workpiece to be brought into close contact with said conveying member is stronger than said component force which causes the first surface of the workpiece to be brought into contact with said rail.

14. A device for conveying a magnetic workpiece having two adjacent surfaces, the device comprising:
    a guide surface for slidably guiding a first surface of said workpiece;
    a conveying surface held in contact with a second surface of said workpiece and which is movable relative to said guide surface;
    driving means for driving said conveying surface to cause it to move relative to said guide surface; and
    a magnet arranged at a position opposite to said guide surface with said conveying surface therebetween and adapted to generate a magnetic force having a component force which causes the second surface of the workpiece to be brought into close contact with said conveying surface and a component force which causes the first surface of the workpiece to be brought into contact with said guide surface.

15. A conveying device according to claim 14,
    wherein yokes are attached to the poles of said magnet, and
    wherein the guide surface is situated in the vicinity of the interface between one pole of said magnet and the yoke.

16. A conveying device according to claim 14,
    wherein said conveying surface is on a belt, and wherein said driving means comprises a pulley around which the belt is to be wound and a motor for driving said pulley.

17. A conveying device according to claim 14, wherein said non-magnetic conveying surface is on a turntable.

18. A conveying device according to claim 14, wherein said component force which causes the second surface of the workpiece to be brought into close contact with said conveying surface is stronger than said component force which causes the first surface of the workpiece to be brought into contact with said guide surface.

19. A method of conveying a magnetic workpiece having two adjacent surfaces, the method comprising the steps of:

slidably guiding a first surface of said workpiece along a guide surface;

holding a conveying surface in contact with a second surface of said workpiece, said conveying surface being movable relative to said guide surface;

driving said conveying surface to cause it to move relative to said guide surface; and generating a magnetic force having a component force which causes the second surface of the workpiece to be brought into close contact with said conveying surface and a component force which causes the first surface of the workpiece to be brought into contact with said guide surface.

20. A conveying method according to claim 19, wherein said step of generating a magnetic force includes:

generating a magnetic force having said component force which causes the second surface of the workpiece to be brought into close contact with said conveying surface is stronger than said component force which causes the first surface of the workpiece to be brought into contact with said guide surface.

* * * * *